United States Patent Office 2,989,486
Patented June 20, 1961

---

2,989,486
OXIDIZABLE COMPOSITIONS STABILIZED WITH 5,6-ARYLO - 3 - HYDROXY-1,2,3,4-TETRAHYDROPYRIDINE COMPOUNDS

Hans Jakob Peterli, Munchenstein, and Hansjorg Heller, Riehen, near Basel, Switzerland, assignors to J. R. Geigy A.-G., Basel, Switzerland
No Drawing. Filed Mar. 23, 1959, Ser. No. 800,939
Claims priority, application Switzerland Apr. 21, 1958
8 Claims. (Cl. 252—403)

The present invention relates to oxidizable compositions stabilized with 5,6-arylo-3-hydroxy-1,2,3,4-tetrahydropyridine compounds. In particular it is concerned with the protection of organic substances which are sensitive to oxygen or oxidation, from the effect of oxygen and from the effect of addition products thereof.

It has been found that organic substances which are sensitive to oxygen or oxidation can be protected from the decomposing action of oxygen or from oxidation or these effects can be greatly retarded if slight amounts of 5,6-arylo-3-hydroxy-1,2,3,4-tetrahydropyridine compounds of the general formula

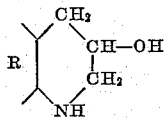

wherein R represents a fused polynuclear arylene radical condensed with the tetrahydropyridine ring at the positions indicated by the valence bonds, are added to the organic substances. In particular naphthalene, hydroxynaphthalene, lower alkoxynaphthalene and acenaphthene radicals are used as such radical R. Particularly good results are obtained when R is a hydroxy-2,1-naphtho radical.

5,6-arylo-3-hydroxy - 1,2,3,4 - tetrahydropyridine compounds according to the present invention are obtained for example by reacting aromatic amines which contain a replaceable hydrogen atom in the o-position to the amino group, under conditions which split off water, with α-halogen hydrins. Those 5,6-arylo-3-hydroxy-1,2,3,4-tetrahydropyridine compounds are preferred which contain a hydrogen atom in the 1-position, i.e. at the nitrogen atom.

These compounds can contain substituents, for example, aliphatic groups such as methyl, ethyl, propyl, isopropyl, tert. butyl, tert. pentyl, iso-octyl, dodecyl or trifluoromethyl groups; cycloaliphatic groups such as cyclopentyl, cyclohexyl or methyl-cyclohexyl groups; araliphatic groups such as benzyl or phenethyl groups; aromatic groups which themselves can be further substituted such as phenyl or chlorophenyl groups; sulphonyl groups such as methyl sulphonyl, ethyl sulphonyl, benzyl sulphonyl or phenyl sulphonyl groups; sulphonic acid dicyclohexylamide, sulphonic acid-N-phenyl-N-alkylamide or sulphonic acid piperidide groups; sulphonic acid ester groups such as sulphonic acid phenyl ester, sulphonic acid methylphenyl ester, sulphonic acid tert. amylphenyl ester or sulphonic acid iso-octylphenyl ester groups; carboxylic acid esters and amides; ether groups such as methoxy, ethoxy, benzyloxy or phenoxy groups; halogens such as fluorine, chlorine, bromine or iodine; cyano groups.

The following aromatic amines are used, for example, for the production of compounds used according to the present invention: 1-aminonaphthalene, 2-aminonaphthalene, 5-hydroxy-1-aminonaphthalene, 5-aminoacenaphthene.

Examples of organic substances which are sensitive to oxygen or oxidation which can be stabilized according to the present invention are hydrocarbons, in particular mineral oils, fats, fatty oils, waxes, ethers, aldehydes and all compounds which contain unsaturated organic groupings, in particular also fatty acids and derivatives thereof as well as saturated and unsaturated, natural and synthetic macromolecular compounds.

Slight amounts of the protective agents are incorporated into the substances to be protected, for example, amounts of 0.001–5.0% of the carrier.

The following examples illustrate the action of the compounds used according to the present invention. Where not otherwise stated, parts are given as parts by weight. The temperatures are in degrees centigrade. The relationship of parts by weight to parts by volume is as that of grammes to cubic centimetres.

EXAMPLE 1

*Stabilization of aldehydes*

0.002 part of the stabilizers given below is added to each 20 parts of freshly distilled enanthaldehyde and the whole is exposed to the effect of oxygen in a shaking vessel which is connected with a gas burette. The amount of oxygen taken up is continuously registered. Table 1 shows the result of this test:

TABLE 1

| Inhibitor | Oxygen take-up in parts by volume | | | |
|---|---|---|---|---|
| | 15 hrs. | 25 hrs. | 50 hrs. | 90 hrs. |
| none | 100 | ≫100 | ≫100 | ≫100 |
| di-tert. butyl-p-cresol | 7 | 11 | 19 | 35 |
| phenyl-α-naphthylamine | 10 | 13 | 23 | 35 |
| 3-hydroxy-2′,1′:5,6-naphtho-1,2,3,4-tetrahydropyridine | 3 | 4 | 7 | 16 |
| 3-hydroxy-4′,5′:5,6-acenaphtheno-1,2,3,4-tetrahydropyridine | 5 | 7 | 10 | 16 |
| 3,5′-dihydroxy-2′,1′:5,6-naphtho-1,2,3,4-tetrahydropyridine | 2 | 4 | 8 | 13 |

The test shows that in a concentration of 0.01%, the arylo-3-hydroxy-1,2,3,4-tetrahydropyridine used according to the present invention more effectively hinder the oxygen take-up than the two compared products, di-tert. butyl-p-cresol and phenyl-α-naphthylamine, used in the art as antioxidants.

If, in the above test for the stabilization of the aldehyde, 0.002 part of 3,4′-dihydroxy-2′,1′:5,6-naphtho-1,2,3,4-tetrahydropyridine or 3-hydroxy-4′-methoxy-2′,1′:5,6-naphtho-1,2,3,4-tetrahydropyridine or 3-hydroxy-4′-ethoxy-2′,1′:5,6-naphtho-1,2,3,4-tetrahydropyridine are used, then a good result similar to that with 3-hydroxy-2′,1′:5,6-naphtho-1,2,3,4-tetrahydropyridine is obtained.

EXAMPLE 2

*Retardation of the oxidation of lubricating oil*

Test method: "Continental Oil Test" according to Ind. Eng. Chem. 33, 339 (1941).

13 parts by volume of "Regal Oil B" of the Texas Company U.S.A. are exposed to an oxygen atmosphere in an apparatus as described in the above article, without mechanical motion. The oxygen consumption is measured by the drop in pressure shown by an Hg manometer attached to the apparatus. The time taken until the drop in pressure is 60 mm. Hg is taken as the standard for the stability of the oil.

Test conditions: 0.5% of bis-salicylal-1,2-propylene diamine ("Du Pont Metal Deactivator") is added to "Regal Oil B" in which 5 copper wires 50 mm. long and 1 mm. diameter have been placed as oxygen catalyst. The oil is then tested at a temperature of 115°. Simultaneously, a sample of this oil to which 0.25% of the antioxidant to be tested has been added, is subjected to the same test. The stabilities measured were:

|   | Hours |
|---|---|
| Without antioxidant | 50 |
| With phenyl-α-naphthylamine | 220 |
| With 3-hydroxy-2',1':5,6-naphtho-1,2,3,4-tetrahydropyridine | 320 |
| With 3,5'-dihydroxy-2',1':5,6-naphtho-1,2,3,4-tetrahydropyridine | 400 |

The two tetrahydropyridine compounds are thus more effective stabilizers for mineral oil than the phenyl-α-naphthylamine usually used in the art.

EXAMPLE 3

*Retardation of the oxidation of rubber*

Test method: Determination of the oxygen absorption by rubber at a raised temperature.

2 parts of a rubber mixture in the form of 3 mm. cubes are exposed to an oxygen atmosphere in an apparatus such as is used for the "Continental Oil Test" (see Example 2), without mechanical motion. The oxygen consumption is measured by the drop in pressure shown by an Hg manometer attached to the apparatus. The drop in pressure is continuously registered.

Test conditions:

Rubber mixture in parts by weight:
  100 Hevea latex crepe
  10 blanc fixe
  5 ZnO
  3 sulphur
  1.5 stearic acid
  1.0 paraffin
  0.6 Captax (2-mercaptobenzothiazole)
  1.5 inhibitor.

Vulcanization: 30 minutes at 140°.
Temperature at which test is made: 100°.

Table 2 shows the result of the test.

TABLE 2

| Inhibitor | Drop in pressure in oxygen in mm. Hg | | | |
|---|---|---|---|---|
|   | 20 hours | 44 hours | 68 hours | 78 hours |
| none | 146 | 380 | ≫380 | ≫380 |
| phenyl-β-naphthylamine | 80 | 168 | 274 | 330 |
| 3-hydroxy-2',1':5,6-naphtho-1,2,3,4-tetrahydropyridine | 30 | 50 | 80 | 108 |
| 3-hydroxy-1',2':5,6-naphtho-1,2,3,4-tetrahydropyridine | 50 | 90 | 140 | 166 |

What we claim is:

1. A composition of matter consisting essentially of a normally oxidizable organic material stabilized against oxidation, with 0.001–5.0% by weight of a compound of the general formula

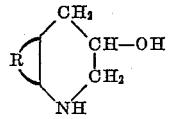

wherein R represents the remainder necessary to complete a nucleus which is condensed with the tetrahydropyridine ring, said nucleus being selected from the group consisting of a naphthalene nucleus, a hydroxynaphthalene nucleus, a lower alkoxynaphthalene nucleus and an acenaphthene nucleus.

2. A composition according to claim 1, wherein the normally oxidizable organic material is lubricating oil.

3. A composition according to claim 1, wherein the normally oxidizable organic material is rubber.

4. A composition of matter consisting essentially of a normally oxidizable organic material stabilized against oxidation with 0.001–5.0% by weight of 3-hydroxy-2',1':5,6-naphtho-1,2,3,4-tetrahydropyridine.

5. A composition of matter consisting essentially of a normally oxidizable organic material stabilized against oxidation with 0.001–5.0% by weight of 3-hydroxy-1',2':5,6-naphtho-1,2,3,4-tetrahydropyridine.

6. A composition of matter consisting essentially of a normally oxidizable organic material stabilized against oxidation with 0.001–5.0% by weight of 3-hydroxy-4',5':5,6-acenaphtheno-1,2,3,4-tetrahydropyridine.

7. A composition of matter consisting essentially of a normally oxidizable organic material stabilized against oxidation with 0.001–5.0% by weight of 3,5'-dihydroxy-2',1':5,6-naphtho-1,2,3,4-tetrahydropyridine.

8. A composition of matter consisting essentially of a normally oxidizable organic material stabilized against oxidation with 0.001–5.0% by weight of 3,4'-dihydroxy-2',1':5,6-naphtho-1,2,3,4-tetrahydropyridine.

References Cited in the file of this patent
UNITED STATES PATENTS
2,647,824    Jones et al. _____ Aug. 4, 1953